/

US010268883B2

(12) United States Patent
Sarkar et al.

(10) Patent No.: US 10,268,883 B2
(45) Date of Patent: Apr. 23, 2019

(54) FORM STRUCTURE EXTRACTION NETWORK

(71) Applicant: Adobe Inc., San Jose, CA (US)

(72) Inventors: Mausoom Sarkar, New Delhi (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 34 days.

(21) Appl. No.: 15/674,100

(22) Filed: Aug. 10, 2017

(65) Prior Publication Data

US 2019/0050640 A1    Feb. 14, 2019

(51) Int. Cl.
| | | |
|---|---|---|
| *G06K 9/00* | (2006.01) | |
| *G06K 9/62* | (2006.01) | |
| *G06K 9/64* | (2006.01) | |
| *G06K 9/72* | (2006.01) | |
| *G06T 3/40* | (2006.01) | |
| *G06T 7/11* | (2017.01) | |
| *G06T 7/143* | (2017.01) | |

(52) U.S. Cl.
CPC ....... *G06K 9/00469* (2013.01); *G06K 9/6252* (2013.01); *G06K 9/6257* (2013.01); *G06K 9/6269* (2013.01); *G06K 9/64* (2013.01); *G06K 9/726* (2013.01); *G06T 3/4046* (2013.01); *G06T 3/4092* (2013.01); *G06T 7/11* (2017.01); *G06T 7/143* (2017.01); *G06K 2009/00489* (2013.01); *G06T 2207/20021* (2013.01); *G06T 2207/20081* (2013.01); *G06T 2207/20084* (2013.01); *G06T 2207/30176* (2013.01)

(58) Field of Classification Search
CPC .. G06K 9/00469; G06K 9/6252; G06K 9/726; G06K 9/64; G06K 9/6257; G06K 9/6269; G06K 2009/00489; G06T 7/143; G06T 3/4092; G06T 3/4046; G06T 7/11; G06T 2207/20084; G06T 2207/20021; G06T 2207/30176; G06T 2207/20081
See application file for complete search history.

(56) References Cited

U.S. PATENT DOCUMENTS

2016/0217119 A1* 7/2016 Dakin ................... G06F 17/243
2017/0004359 A1* 1/2017 Venkatachalam ......... G06T 7/11

OTHER PUBLICATIONS

Visin, et al., "ReSeg: A Recurrent Neural Network-based Model for Semantic Segmentation," CVPR workshop paper, Computer Vision Foundation, 2016. 8 pages.

* cited by examiner

*Primary Examiner* — Menatoallah Youssef
(74) *Attorney, Agent, or Firm* — Finch & Maloney PLLC

(57) ABSTRACT

A method and system for detecting and extracting accurate and precise structure in documents. A high-resolution image of documents is segmented into a set of tiles. Each tile is processed by a convolutional network and subsequently by a set of recurrent networks for each row and column. A global-lookup process is disclosed that allows "future" information required for accurate assessment by the recurrent neural networks to be considered. Utilization of high-resolution image allows for precise and accurate feature extraction while segmentation into tiles facilitates the tractable processing of the high-resolution image within reasonable computational resource bounds.

19 Claims, 14 Drawing Sheets

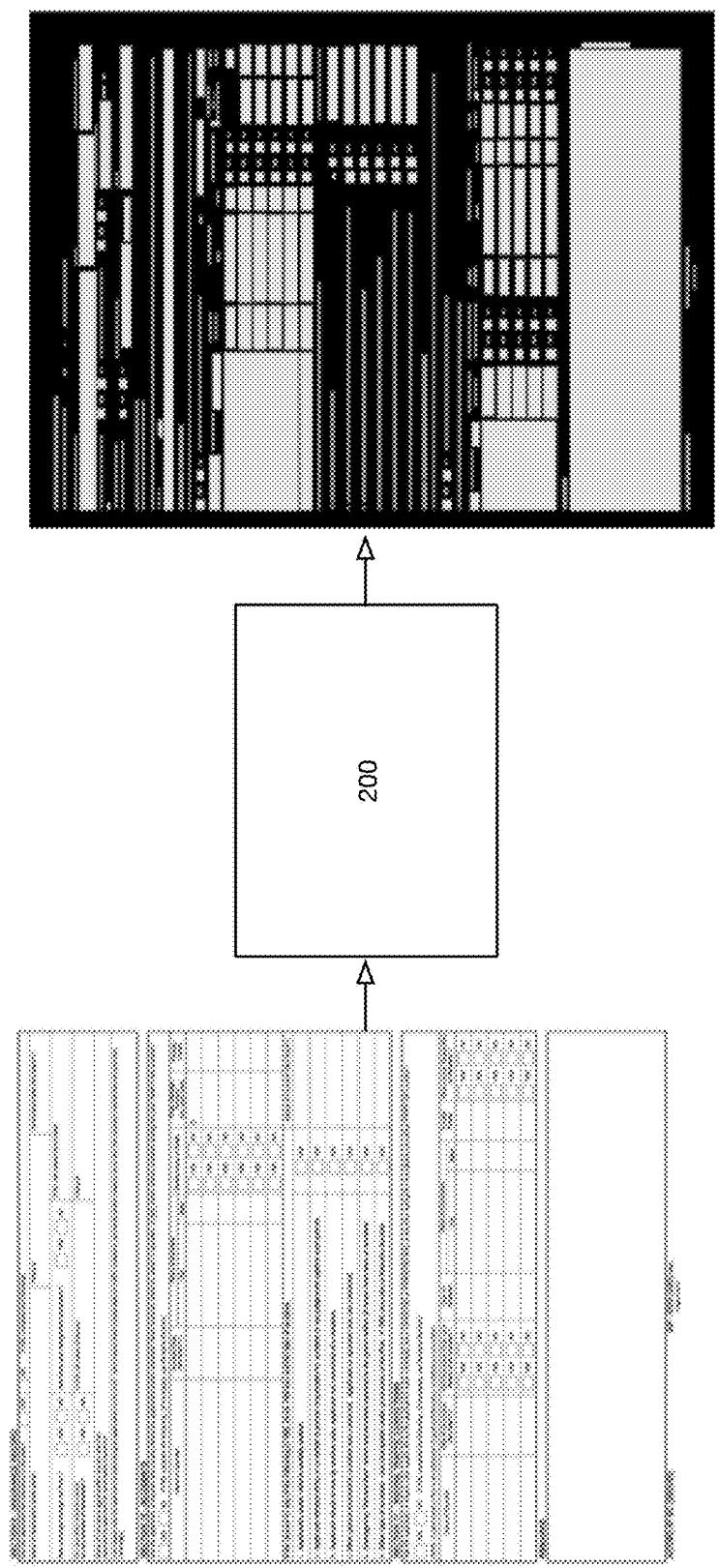

FORM STRUCTURE EXTRACTION NETWORK

FIELD OF THE DISCLOSURE

This disclosure relates to techniques for identifying the structure and semantics of form documents such as PDFs. In particular, this disclosure relates to techniques for processing of documents using deep learning and deep neural networks ("DNN") to extract structure and semantics.

BACKGROUND

The use of forms for capturing and disseminating information has become ubiquitous. Often these forms have not been digitized and reside in a hard-copy format. Even if forms have been digitized and converted to electronic format, they may only support interaction via a specific electronic device such as a personal computer but may not be accessible on mobile devices. An adaptive form is an electronic form that can automatically adapt to viewing and input on a multitude of devices, each having disparate form factors such as personal computers, tablets, smartphones, etc.

Businesses and governments are undergoing a digital transformation whereby mobile occupies the primary digital strategy for all new offerings. The trend toward digital technology is driven by a host of compelling business and revenue incentives. Accordingly, organizations are required to both digitize and provide a multi-channel story. However, many existing account enrollment and service request processes remain paper based. Currently, to implement digital adaptive form technology, businesses must hire form/content authors to manually replicate current experiences and build mobile ready experiences field-by-field, which is time consuming, expensive and requires IT ("Information Technology") skills.

The elements in a form are typically arranged in a hierarchy. For example, the document is the top-level element. Underneath the document there may be sections, which comprise the next level in the hierarchy and so on.

Fields are yet another vital form structural element. Fields may comprise a combination of a widget and a caption. Widgets are areas of a form that facilitate and prompt the entry of information by a user. Each widget may have a caption associated with it. A caption is a piece of textual or other signaling information that may assist a user in providing input in a widget. Examples of widgets may include sections and choice groups. Choice groups are a group of items that allows a user to select one or multiple items via checkboxes or radio buttons. Tables are another example of structural elements that may further comprise column headers, row headers and actual widgets in which a user may fill in information. In addition, a form will typically further contain text sections that are constructed of paragraphs, text lines and words. Even images may be embedded in a form.

One of the main problems in rapidly converting paper forms to adaptive forms is to identify the structure and semantics of form documents from an image or image-like format. Once the form structure is extracted and its hierarchical properties captured, this structural information may be utilized for various purposes such as creating an electronic adaptive form, etc.

Machine learning and deep neural networks ("DNNs") have been applied to document structure extraction. However, due to the computational costs (e.g., memory demands and limits on efficient information propagation) of working with high resolution images, known methods for applying DNNs to document structure extraction from an image require the use of lower resolution input images. Therefore, typically an input image provided to a DNN for structure extraction is first down-sampled from a higher resolution image. While the use of lower resolution document images may solve the practical issues of reducing computational costs for performing form identification and extraction, it also imposes significant limitations on a DNN's ability to elicit very fine structure in a document. Thus, there is a need for techniques for extracting document structure from a high-resolution document image using machine learning and DNNs that can be performed in a computationally efficient and tractable manner.

BRIEF DESCRIPTION OF THE DRAWINGS

FIG. 4 depicts an input image and output image that has been processed by a form extraction network according to an embodiment of the present disclosure.

DETAILED DESCRIPTION

Figure 1A:
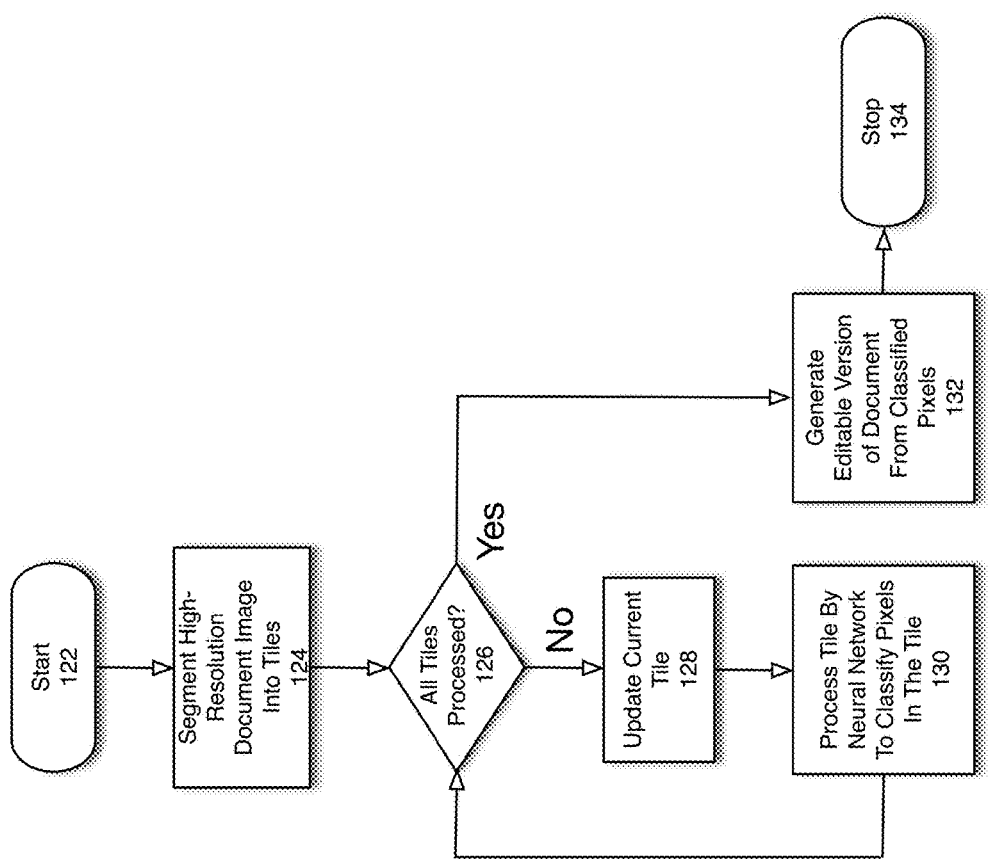
FIG. 1a is a flowchart depicting an operation of a form structure extraction network according to an embodiment of the present disclosure.

According to an embodiment described in this disclosure, techniques are described for identifying and extracting the structure and semantics of a form document from a high-resolution image of the form document. For purposes of this discussion, the term form document and form will be used interchangeably. Upon extracting the structure of a form, this structure information may be utilized to adapt the form to be utilized in a desired context. Examples of form structure may include logical sections of the form, personal information such as credit card or address information, financial information, form heading, headers, footers, etc.

According to an embodiment described in the present disclosure, a form extraction network comprises a deep neural network ("DNN") architecture that may automatically identify various form elements and larger semantic structures based upon a high-resolution image of the form. According to an embodiment of the present disclosure, a form extraction network provides an end-to-end differentiable pipeline for detecting and extracting document structure. According to an embodiment of the present disclosure, the form extraction network receives a high-resolution image of a document form to be analyzed (comprising raw pixels) and generates classified features corresponding to form elements. In particular, according to one embodiment, each pixel of the high-resolution image is associated with a classification vector that indicates a probability that that pixel is of a particular class. The aggregate set of classified pixels for the entire high-resolution document image can then be utilized to classify larger groupings of pixels as particular form elements.

To reduce computational resource demands in processing high-resolution images, the form extraction network may process a subset of a document image using an iterative process. Each subset of the document form image is referred to herein as a tile and comprises a subset of pixels of the pixels in the entire document form image. The form extraction network may comprise a convolutional network for detecting features of individual tiles of the form, a multidimensional recurrent neural network ("RNN") for maintaining spatial state information spanning spatially across tiles and a global-lookup module for modifying state information of the multidimensional RNN based upon a global lookup of form features from a lower dimensional image of the form document. As will be understood, an RNN is a type of neural network that is well suited for processing of sequences.

In brief, according to an embodiment of the present disclosure, an architecture for performing form extraction from a high-resolution document image may comprise two branches: (1) a first branch that produces a global tensor representation of the entire image via an autoencoder, and (2) a second branch that comprises convolutional and 2-D RNN layers that operate on the image in a tile-by-tile fashion. According to various embodiments, the state of the RNNs is stored at tile boundaries and then subsequently employed to initialize the RNNs of the subsequent tiles. The RNNs are also equipped with an attention mechanism which can look up and retrieve information from the global document representation of the first branch.

According to various embodiments, a global lookup function may be performed by extracting features from a lower-resolution representation of the high-resolution image. The global lookup may be performed on a much smaller dimensional image, which provides significant computational benefits. This permits the 2-D RNN to do a look-ahead based upon the features detected in the lower-dimensional representation of the entire image. Accordingly, the 2-D RNN running on the high-resolution image may access the features that have been extracted from the low-resolution trunk and perform a look-up to make a decision about a current pixel and utilize information that may in fact be in the "future" from the perspective of the direction the 2-D RNN runs.

Thus, according to an embodiment described in the present disclosure, a convolutional network that processes individual tiles of a high-resolution document image is combined with a multi-dimensional RNN to account for information that spans across tiles. According to various embodiments, a global lookup function is provided that allows the 2-D RNN to do look-ahead (i.e., consider information in the "future" in the context of the direction in which the 2-D RNN operates).

FIG. 1a is a flowchart depicting an operation of a form structure extraction network according to an embodiment of the present disclosure. The process is initiated in 122. In 124 a high-resolution document image comprising a plurality of pixels is segmented into a set of tiles, each tile comprising a subset of pixels of the high-resolution document image. In 126 it is determined whether all tiles have been processed. If not ('No' branch of 126), in 128 the current tile is updated. In 130 the tile is then processed by a neural network to classify pixels in the tile with particular document elements. A process and system for performing such classification is described below with respect to FIGS. 1b, 2a-2c. Flow then continues with 126.

If all tiles have been processed ('Yes' branch of 126), flow continues with 132 in which an editable version of the document is generated from the classified pixels. The process ends in 134.

Figure 1B:
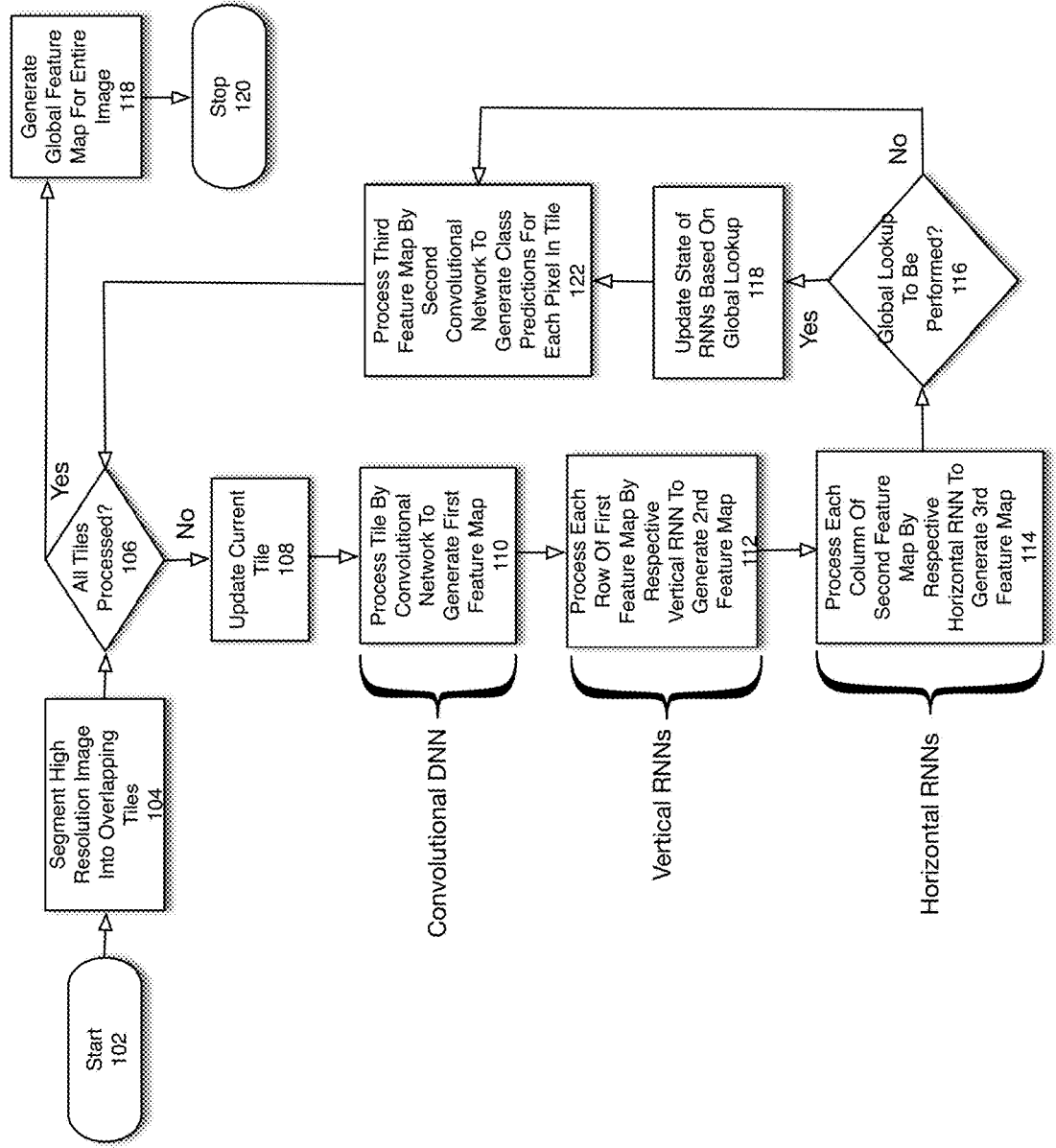
FIG. 1b is a flowchart depicting a more detailed operation of a form structure extraction network according to an embodiment of the present disclosure.

FIG. 1b is a flowchart depicting a detailed operation of a form structure extraction network according to an embodiment of the present disclosure. The process is initiated in 102. In 104, a high-resolution image is segmented into multiple tiles. According to an embodiment described in the present disclosure, the input image provided to the form extraction network is a high-resolution image of a document. Because a high-resolution image is utilized, a larger convolutional neural network would be required to process the image than might otherwise be necessary were a lower dimensional image utilized. However, as previously discussed, a larger convolutional neural network presents significant computational challenges—in particular demands on available computer memory and information propagation within a computation structure.

To address these computational challenges, according to an embodiment described in the present disclosure, a high-dimensional image is separated into a set of tiles. Each tile may be a subset of pixels from the original high-dimensional image and each tile may then be processed separately from one another. However, the high-resolution quality of the image is not reduced since each tile retains the resolution of the original image. Thus, because each tile comprises a subset of the original high-resolution image and is processed independently of other tiles, the instantaneous memory and other computational requirements that would be require in processing the entirety of the high-dimensional image are abated. According to an embodiment described herein, the tiles are generated from an image by segmenting the image into rows and columns each having respective heights and widths. According to some embodiments, the tiles may overlap with one another.

In 106, it is determined whether all tiles have been processed. If so ('Yes' branch of 106), in 118 a global feature map of the entire image is generated. Techniques for generating a global feature map of the entire image are described below. The process then ends in 120.

If all tiles have not been processed ('No' branch of 106), the current tile to be processed is updated from the pool of all available tiles for the document image. In 110, the current tile is processed by a convolutional neural network to generate a first feature map. Example embodiments of convolutional neural networks are described below.

Because the convolutional network only "sees" or processes individual tiles at one time, it is not able to extract features that span across multiple tiles. To address this issue, information spanning multiple tiles may be leveraged using a state preserving network such as a RNN. In particular, as will be described, according to various embodiments a 2-D RNN may be employed to maintain state information across the horizontal and vertical spatial dimensions of the document image using a hidden state representation. As will become evident, the 2-D RNN may be decomposed into a vertical RNN and a horizontal RNN. In turn the vertical RNN may comprise a set of RNNs and the horizontal RNN may also comprise a set of RNNs so that both the vertical and horizontal RNNs may operate in parallel. The description of a parallel operation of the vertical and horizontal RNNs is provided below.

Accordingly, in 112 the vertical RNNs process each row of the current tile in the vertical dimension. According to various embodiments, the respective set of RNNs comprising the vertical RNN may be utilized to process all the columns of the first feature map of the current tile in parallel. In this fashion, the vertical RNN generates a second feature map from the first feature map.

In an analogous fashion to the vertical RNN, in 114, a horizontal RNN processes each column of the second feature map consecutively to generate a third feature map. As with the vertical RNN, the horizontal RNN, since it may be comprised of a set of individual RNNs, may process each row of the second feature map in a parallel fashion.

According to some embodiments, the 2-D RNN may operate in left-to-right fashion and then top-to-bottom fashion. Although information from the top pixel may be propagated to the bottom pixel, there is an inherent asymmetry in the flow of information and therefore information propagation cannot occur in the reverse direction—i.e., from the bottom-to-top using the current example. Similarly, although information may flow from left-to-right, no mechanism exists to facilitate the flow of information from right-to-left. Alternatively, the 2-D RNN may operate right-to-left and/or bottom-to-top. Regardless, the particular direction in which the RNN runs limits the direction of flow of information. This limits the ability of the network to form accurate inferences as a look-ahead may be required to make an accurate classification regarding the current pixel. That is, information from the "future" with respect to the direction in which the network is operated may be required for the current inference.

One potential solution to this issue would be to run the 2-D RNN in both directions, for example, from bottom-to-top, top-to-bottom, right-to-left and left-to-right. However, this approach would introduce additional computation cost.

Instead, according to one embodiment, an additional trunk is introduced into the network (described below) for performing a global-lookup so that a look-ahead is achieved and features in the "future" may be considered. Accordingly, in 116 it is determined whether a global-lookup is to be performed. According to one embodiment a global lookup may be performed based upon a pre-determined cadence (number of steps) of the 2-D RNN. If the global lookup is not to be performed ("No" branch of 116), flow continues with 122.

If a global lookup is to be performed ('Yes' branch of 116), flow continues with 118 and the state of the 2-D RNN is updated using a global lookup. Techniques for performing a global lookup are described below with respect to FIG. 2b and associated discussion.

In 122, the third feature map is processed by a second convolutional neural network to generate class predictions for each pixel in the current tile. Flow then continues with 106 where it is determined whether all tiles have been processed.

Figure 2A:
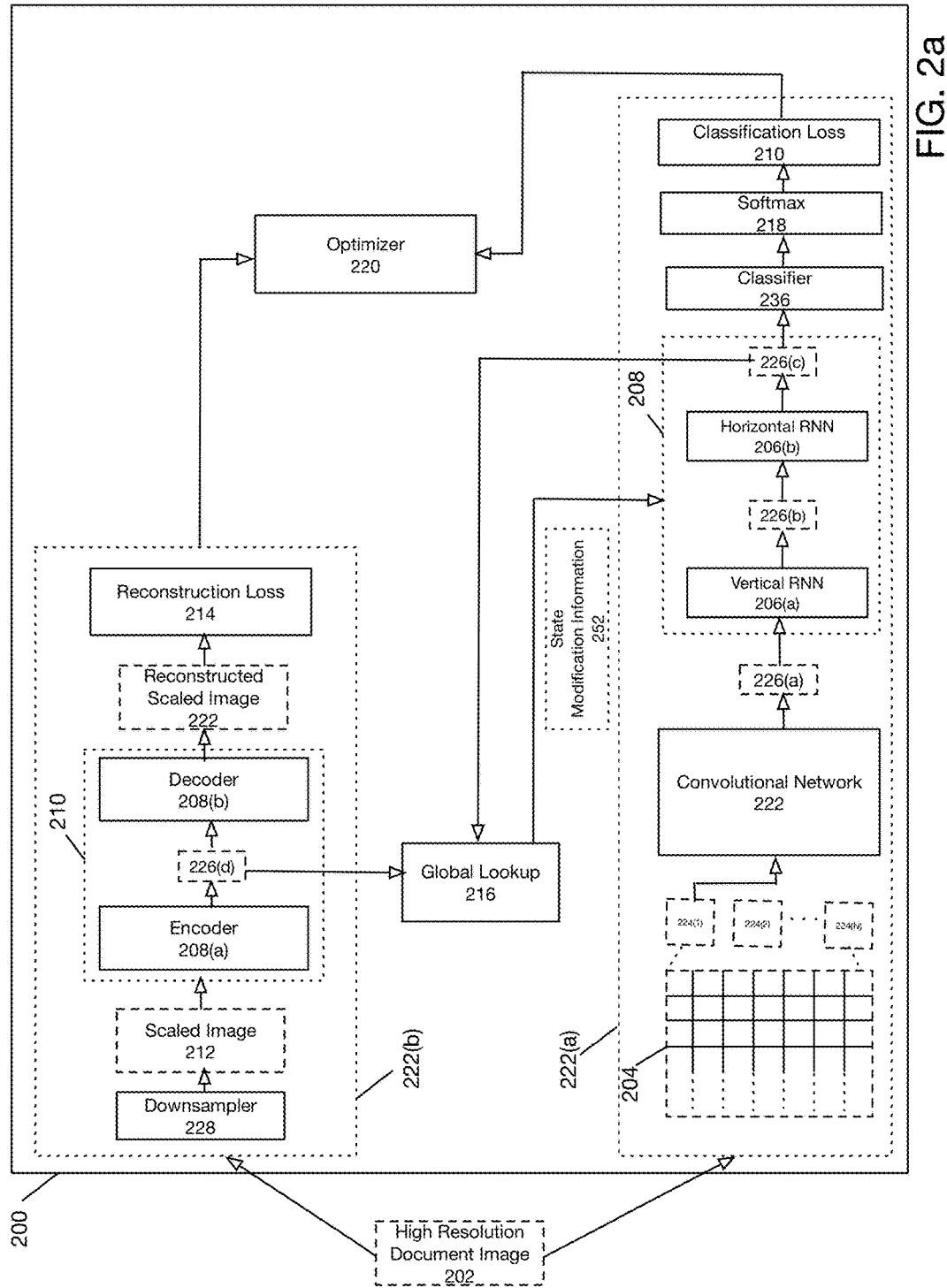
FIG. 2a is a block diagram of a form extraction network according to an embodiment of the present disclosure.

FIG. 2a is a block diagram of a form extraction network according to an embodiment of the present disclosure. Form extraction network 200 further comprises first branch 222 (a), second branch 222(b), optimizer 220 and global lookup block 216. First branch 222(a) further comprises tile extraction block 204, convolutional network 222, 2-D RNN 208, classifier 236, softmax block 218 and classification loss block 210. 2-D RNN 208 further comprises vertical RNN 206(a) and horizontal RNN 206(b). Second branch 222(b) further comprises autoencoder block 210 and reconstruction loss block 214. Autoencoder block 210 further comprises encoder 208(a) and decoder 208(b).

It will be understood that FIG. 2a depicts a high-level view of form extraction network 200. According to various embodiments, form extraction network 200 is associated with an underlying model architecture (not shown in FIG. 2a) comprising a set of artificial neural network layers. Each layer may be comprised of a set of nodes or units embodying an artificial neuron. The arrangement of layers and interconnection of nodes between layers forms an architectural model for form extraction network 200. Each interconnection between two neurons may be associated with a weight, which may be learned during learning or training phase (described below). Each neuron may also be associated with a bias term, which may also be learned during a training process.

Each artificial neuron may receive a set of signals from other artificial neurons to which it is connected. Typically, the neuron generates a weighted sum of the respective signal and weight for each interconnection by forming a linear superposition of the signal and weight as well as the bias term associated with that artificial neuron to generate a scalar value. Each artificial neuron may also be associated with an activation function, which typically is a nonlinear univariate function with smooth derivatives. The activation function may then be applied to the scalar value to generate an output value, which comprises an output signal for the artificial neuron, which then may be provided to other artificial neurons to which that artificial neuron is connected.

It will be further understood that form extraction network 200 will be utilized in at least two different phases: (1) a learning or training phase and (2) an inference phase. As previously described, during the training phase, the set of weights associated with each interconnection between two artificial neurons as well as the bias terms associated with each artificial neuron is computed. Typically, the training phase may utilize a training and validation set comprising a set of training and validation examples. One or more loss functions may be associated with various outputs of form extraction network, which represent a distance metric between a target output value associated with a respective training example and the actual computed output value. Typical loss functions may include a cross-entropy classification loss function. An optimization algorithm is then applied to form extraction network 200 to generate an optimal set of weights and biases for the provided training and validation sets. Optimization algorithms may include some variant of gradient descent such as stochastic gradient descent. Typically, during the training phase, a backpropagation algorithm is applied to learn the weights of all the artificial neurons in the network.

Once form extraction network 200 has been trained, it may be used in an inference phase. During the inference phase, actual real-world inputs comprising actual form document images may be provided to form extraction network 200 to generate classification of form elements. The inference phase utilizes the weights and biases learned during the training phase.

As shown in FIG. 2*a*, high-resolution document image 202 is received by first and second branches (222(*a*)-222(*b*)) of form extraction network 200. As will be understood, high-resolution document image 202 may comprise a pixel map corresponding to a digital image of a document. The pixel map may, for example, represent a grayscale intensity associated with each of a plurality of spatial points of an image. According to one embodiment, each pixel may encode a grayscale intensity value. According to alternative embodiments, each pixel may encode a color value comprising red, green and blue intensity values, which may be represented as channels in the context of DNNs.

The processing performed by first branch 222(*a*) of form extraction network 200 will now be described. Segmentation block 204 receives high-resolution document image 202 and segments high-resolution document image 202 into tiles 224(1)-224(N). Each tile 224(1)-224(N) may be a subset of high-resolution document image 202 and thereby comprises a pixel map of a disjoint region of high-resolution image 202. According to one embodiment, the segmentation of high-resolution document image into tiles 224(1)-224(N) may be performed as a batch step or may be performed in a pipeline fashion as each tile is processed by first branch 222(*a*). According to one embodiment overlapping tiles of dimension 227 pixels×227 pixels are generated from high-resolution document image 202. However, any other dimensions are possible.

According to one embodiment, each tile 224(1)-224(N) is individually processed by convolutional network 222 to generate feature map 226(*a*). According to one embodiment, feature map 226(*a*) is a tensor of general dimension H×W×C. Convolutional network 222 may comprise a convolutional neural network that operates in a translation invariant and rotationally invariant manner to process a multidimensional array of input pixels to generate feature map 226(*a*) (also a multidimensional array). Feature map 226(*a*) may be referred to as a tensor, which does not have the same formal meaning as a tensor in mathematics. Instead, it will be understood that feature map 226(*a*) comprises a multidimensional array of at least dimension 2. Example embodiments of feature map 226(*a*) and illustrative dimensions are discussed below.

According to one embodiment of the present disclosure, convolutional network may exhibit the following architecture:

| Layer Type | Kernel Size ($K_w \times K_h$) × Channels × Stride |
|---|---|
| Conv | 7 × 7 × 32 × 1 |
| LRN (Local Response Normalization) | |
| Conv | 5 × 5 × 64 × 1 |
| Conv | 5 × 5 × 128 × 1 |
| Conv | 5 × 5 × 192 × 1 |
| Conv | 5 × 5 × 256 × 1 |

According to an embodiment described in the present disclosure, convolutional network 222 does not employ any reduction elements or layer such as a max pool, etc. In this fashion, there will be some feature in the feature map for each and every pixel of a given tile 224(1)-224(N).

First feature map 226(*a*) is then processed by 2-D RNN 208. As will be understood, 2-D RNN 208 may maintain state information so that it can process sequences of inputs utilizing the saved state information. Because 2-D RNN 208 may utilize saved state information generated during processing of previous tiles, 2-D RNN 208 may utilize this historical information from previously processed tiles 224(1)-224(N) during the processing of the current tile.

As previously discussed, 2-D RNN 208 may further comprise vertical RNN 206(*a*) and horizontal RNN 206(*b*). According to one embodiment, horizontal RNN 206(*a*) and vertical RNN 206(*b*) may be internally identical. However, vertical RNN 206(*a*) may be configured to process rows of first feature map 226(*a*), while horizontal RNN 206(*b*) may be configured to process columns of first feature map 226(*a*) in a particular sequence. According to one embodiment, feature map 226(*a*) is processed by vertical RNN 206(*a*) to generate second feature map 226(*b*), which may also be understood to be a multidimensional array. According to one embodiment, as described below, vertical RNN 206(*a*) may further comprise a set of RNNs such that each RNN may independently and in parallel process a column of first feature map 226(*a*). According to one embodiment, each of the RNNs comprising vertical RNN 206(*a*) may be a LSTM ("Long Short Term Memory") network.

Second feature map 226(*b*) is then processed by horizontal RNN 206(*b*) to generate feature map 226(*c*). Similar to vertical RNN 206(*a*), horizontal RNN 206(*b*) may comprise a set of RNNs, which this case may independently and in parallel process each row of second feature map 226(*b*). And, similar to vertical RNN 206(*a*) each of the RNNs comprising horizontal RNN 206(*b*) may be a LSTM network.

Feature map 226(*c*) is then processed by classifier 236 to generate class predictions for each pixel in the current tile. Classifier generates a vector of components indicating an association for each pixel in a tile (i.e., 224(1)-224(N)) with respect to a particular document element class. For example, according to one embodiment document element classes comprise text fields, tables, text-entry fields, etc. That is, each component in the vector may indicate some correlation that a given pixel is of a particular class. According to one embodiment, classifier 236 is a 1×1 convolutional network.

The output of classifier (not shown in FIG. 2*a*) is then processed by softmax block 218. The concept of a softmax function is well understood in the fields of machine learning and deep neural networks and will not be discussed in detail here. However, for purposes of this discussion, it is sufficient to understand that softmax block 218 may operate to normalize a vector, wherein each vector component represents a particular class, such that the normal of the vector is unity. In this way, the output of the softmax represents a probability distribution.

Softmax block 218 generates a normalized classifier vector (not shown in FIG. 2*a*). Classification loss block 210 processes the output of softmax block 218 using a loss function. According to one embodiment, classification loss block 210 may utilize a cross-entropy loss function. Classification loss block 210 may generate a loss metric value (not shown in FIG. 2*a*), which represents the performance of form extraction network 200 in successfully classifying a given training element.

Optimizer 220 is utilized during a training phase of form extraction network 200. In particular, optimizer 220 receives the loss metric value from classification loss block 210, which it utilizes iteratively during the training phase to refine the weights and biases of form extraction network 200. According to one embodiment, optimizer 220 may use a stochastic gradient descent ("SGD") method or any other optimization method. Further, optimizer 220 may employ the backpropagation algorithm for refining the weights and biases of the artificial neurons comprising form extraction network.

The processing performed by second branch 222(b) of form extraction network 200 will now be described. As shown in FIG. 2a, high resolution document image 202 is received by downsampler 228, which generates scaled image 212. It will be understood that scaled image 212 is a lower dimensional representation of high resolution document image 202. Scaled image 212 is then processed by autoencoder 210. According to an embodiment described in the present disclosure, autoencoder 210 in a first phase processes scaled image using encoder 208(a) to generate feature map 226(d), which may be a lower dimensional representation of scaled image 212 in what is commonly referred to as the latent space. Encoder 208(a) effectively maps the higher dimensional input of scaled image 212 via a bottleneck layer to feature map 226(d). Autoencoder in a second phase utilizes decoder 208(b) to map the latent space representation (i.e., feature map 226(d)) back to the higher dimensional space associated with scaled image 212 to generate reconstructed scaled image 222.

In particular, during the first phase, encoder 208(a) generates feature map 226(d), which is provided to decoder 208(b). According to one embodiment, encoder 208(a) may utilize the following architecture.

| Layer Type | Count of Layers | Kernel Size ($K_w \times K_h$) × Channels × Stride |
| --- | --- | --- |
| Conv | 1 | 5 × 5 × 32 × 1 |
| LRN | 1 | |
| Conv | 1 | 3 × 3 × 64 × 1 |
| MaxPool | 1 | 3 × 3 × 64 × 2 |
| Conv | 2 | 3 × 3 × 128 × 1 |
| MaxPool | 1 | 3 × 3 × 128 × 2 |
| Conv | 2 | 3 × 3 × 128 × 1 |
| MaxPool | 1 | 3 × 3 × 128 × 2 |
| Conv | 4 | 3 × 3 × 192 × 1 |
| MaxPool | 1 | 3 × 3 × 192 × 2 |
| Conv | 3 | 3 × 3 × 256 × 1 |
| Dropout | 1 | |
| Conv | 1 | 3 × 3 × 256 × 1 |

However, other architectures are possible.

According to one embodiment, decoder 208(b) may utilize the following architecture:

| Layer Type | Count of Layers | Kernel Size ($K_w \times K_h$) × Channels × Stride |
| --- | --- | --- |
| Conv | 1 | 3 × 3 × 256 × 1 |
| Transpose | 1 | 3 × 3 × 128 × 2 |
| Transpose | 1 | 3 × 3 × 64 × 2 |
| Transpose | 1 | 3 × 3 × 16 × 2 |
| Transpose | 1 | 3 × 3 × 1 × 2 |

However, other architectures are possible.

Reconstruction loss block 214 is utilized during a training phase in conjunction with optimizer (previously described) to determine weights and biases associated with the second branch 222(b) of form extraction network 200. According to one embodiment, reconstruction loss block 214 may utilize, for example, an L2 (squared loss) to calculate the loss between scaled image 212 and reconstructed scaled image 222 generated by autoencoder 210. Any other loss function may be utilized such as an L1 loss function. In particular, reconstruction loss block 214 may generate a scalar output characterizing the reconstruction loss, which is provided to optimizer 220. As previously described, optimizer 220 may utilize the backpropagation algorithm in conjunction with an optimization algorithm such as SGD to generate weights and biases for form extraction network 200 during a training phase.

As previously described, because 2-D RNN 208 runs in a particular direction (e.g., top-to-bottom and left-to-right), unless 2-D RNN 208 were also run in the reverse direction, features in the "future" (in terms of the direction of the running of 2-D RNN) are not available during the processing of any given tile. However, in order to avoid the computational inefficiencies in causing 2-D RNN to run in both directions, according to an embodiment of the present disclosure, a global lookup functionality is achieved via global lookup block 216 that allows 2-D RNN 210 to perform look-ahead and thereby consider "future" information from tiles that have not yet been processed by 2-D RNN.

According to one embodiment, in order to determine "future" information, a mapping between features in scaled image 212 and the high-resolution tiles 214(1)-214(N) is generated. This mapping is referred to herein as a global lookup and is performed by global lookup block 216. According to an embodiment of the present disclosure, the task of learning this mapping in order to perform the global lookup is a task that may be solved by form extraction network 200 and in particular global lookup block 216.

In particular, after a finite number of steps, horizontal RNN 206(b) may attempt to generate an approximate Gaussian or pseudo-Gaussian mask that is multiplied by feature map 226(d) output from the autoencoder. According to one embodiment, the finite number of steps is 16 but any other value is possible. The Gaussian or pseudo-Gaussian mask is referred to as an attention map and is generated based upon feature map 226(c), which is output by horizontal RNN 206(b). According to one embodiment, this mask operates like a softmax and therefore the output is effectively a probability distribution. By calculating an expected value using this probability distribution, an expected feature may be determined. The expected feature is used by the RNN to perform its prediction. This keeps repeating for a periodic number of steps of horizontal RNN 206(b). Global lookup block 216 determines a mask or attention map, in a manner described below.

More precisely, according to one embodiment, global lookup block 216 receives feature map 226(c) (output of horizontal RNN 206(b)) and based upon feature map 226(c) generates N simultaneous attention maps (not shown in FIG. 2a).

The meaning of an attention map will be understood by skilled practitioners. The attention mechanism is implemented via dynamic mask generation by each RNN (depending on the current location in high resolution tile), which is used to identify the spatial locations on the global tensor representation. In addition, global lookup block 216 receives feature map 226(d) (output of encoder 208(a)). Using the N simultaneous attention maps and feature map 226(c), global lookup block 216 generates state modification information 252, which is utilized to modify state information of 2-D RNN 208. More details of how the state modification information is generated is described below with respect to FIG. 2b.

In modifying the state of 2-D RNN 208, global lookup block effectively causes 2-D RNN 208 to perform a look-ahead and thereby consider "future" information for tiles it has not yet "seen". As previously described, "future information" pertains to information otherwise unavailable due to the direction in which 2-D RNN 208 operates. For example, if 2-D RNN 208 operates from left-to-right and from top-to-bottom, "future" information would pertain to data from right-to-left and/or from bottom-to-top. Further details on the generation of state modification information is described below and with respect to FIG. 2*b*.

According to one embodiment, global lookup block 216 utilizes output of horizontal RNN 206(*b*) (feature map 226(*c*)) in performing the global lookup operation. However, according to other embodiments, global look-up block 216 may perform a global lookup using output generated by vertical RNN 206(*a*) or both the horizontal 206(*b*) and vertical RNNs 206(*a*).

Figure 2B:
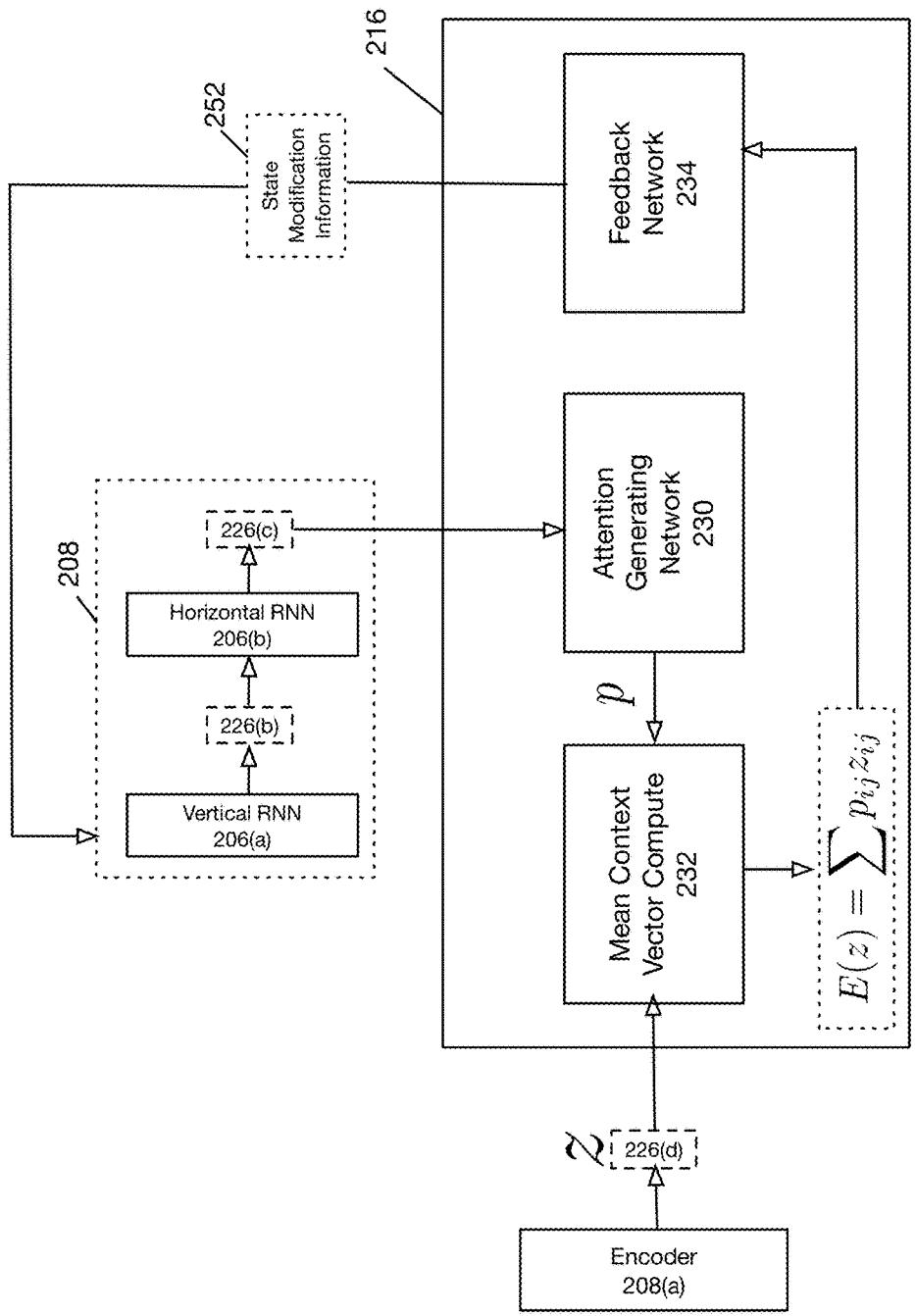
FIG. 2b is a detailed block diagram of global lookup block 216 according to an embodiment of the present disclosure.

FIG. 2*b* is a detailed block diagram of global lookup block 216 according to an embodiment of the present disclosure. As shown in FIG. 2*b*, global lookup block 216 may further comprise attention generating network 230, mean context vector compute block 232 and feedback network 234. The output of horizontal RNN (feature map 226(*c*)) is provided to attention generating network 230. Attention generating network 230 processes feature map 226(*c*) to generate one or more attention maps (denoted by p) each of which is provided to mean context vector compute block 232. Attention generating network 230 may comprise a DNN having a plurality of layers and may utilize the following architecture:

| Layer Type | Config | Description |
| --- | --- | --- |
| Conv | 64 × 1 × 9 × 4 | Kernel Size ($K_w$ × $K_h$) × Channels × Stride |
| FullyConnected | 12168 | Map size (Encoder$_w$ × Encoder$_h$) × Attention Maps. Here derived from (39 × 39 × 8) = 12168 |
| SoftMax | Per Map | |

Encoder output (feature map 226(*d*)) denoted by z is also provided to mean context vector compute block 232. According to one embodiment, encoder output (feature map 226(*d*)) z is a tensor of dimension H×W×C, where C indicates a number of channels. Each attention map generated by network 230, on the other hand, may be a tensor of dimension H×W×1.

For each attention map, mean context vector compute block 232 computes a mean context vector E according to: $E(z)=\Sigma p_{ij} z_{ij}$, which is of dimension 1×C yielding N E(z), each of dimension 1×C. Each of the N E(z) is provided to feedback network 234, which generates state modification information 252, that is provided to 2-D RNN 208 to modify the state information associated with 2-D RNN 208. According to an embodiment described herein, feedback network 234 may comprise an RNN and may comprise the following architecture:

| Layer | Config | Description |
| --- | --- | --- |
| ConvTranspose | 3 × 4 × 1 × 256 × 3 | Layer Count × Kernel Size ($K_w$ × $K_h$) × Channels × Stride |
| Crop Layer | 227 × 1 × 256 | Match the Horizontal RNN State Size |
| Concat | | Concat Channel Wise with RNN State Vector |

| Layer | Config | Description |
| --- | --- | --- |
| Conv | 1 × 1 × 1 × 32 × 1 | Layer Count × Kernel Size ($K_w$ × $K_h$) × Channels × Stride |

Figure 2C:
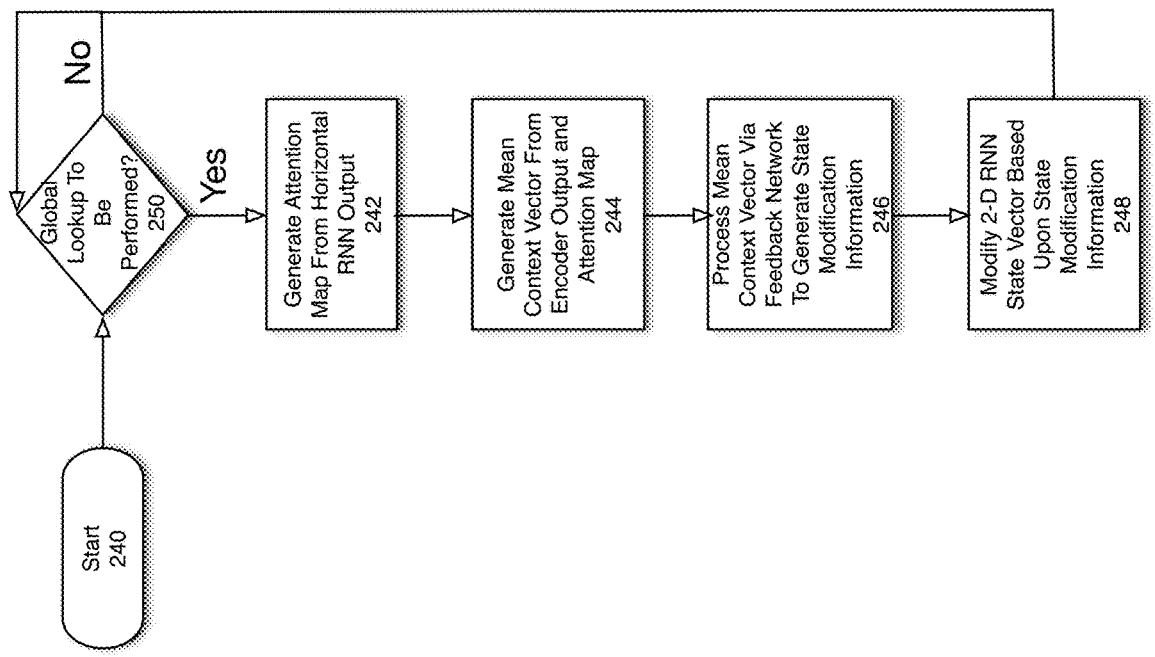
FIG. 2c is a flowchart of a global lookup processing according to an embodiment of the present disclosure.

FIG. 2*c* is a flowchart of a global lookup processing according to an embodiment of the present disclosure. The process depicted in FIG. 2*c* may be performed by global lookup block 216 previously described with respect to FIG. 2*b*. The process is initiated in 240. In 250, it is determined whether a global lookup is to be performed. According to an embodiment described herein, a global lookup may be performed repeatedly upon a finite number of steps (e.g., after a finite number of tiles have been processed). According to one embodiment, the global lookup is performed every 16 steps. However, any other finite interval is possible. If it is not time to perform a global lookup ('No' branch of 250), flow continues with 250.

If a global lookup is to be performed ('Yes' branch of 250), flow continues with 242. In 242, an attention map (p) is generated based the output of horizontal RNN 206(*b*) (p). In 244, a mean context vector (E(z)) is generated based upon the attention map (p) and encoder output (z). Generation of a mean context vector is described above with respect to FIG. 2*b*. In 246, the mean context vector is processed via feedback network 234 to generate state modification information 252. In 248, state vector information associated with 2-D RNN 208 is modified based upon state modification information 252. Flow then continues with 250 in which it is determined whether a global lookup should be performed.

Figure 3A:
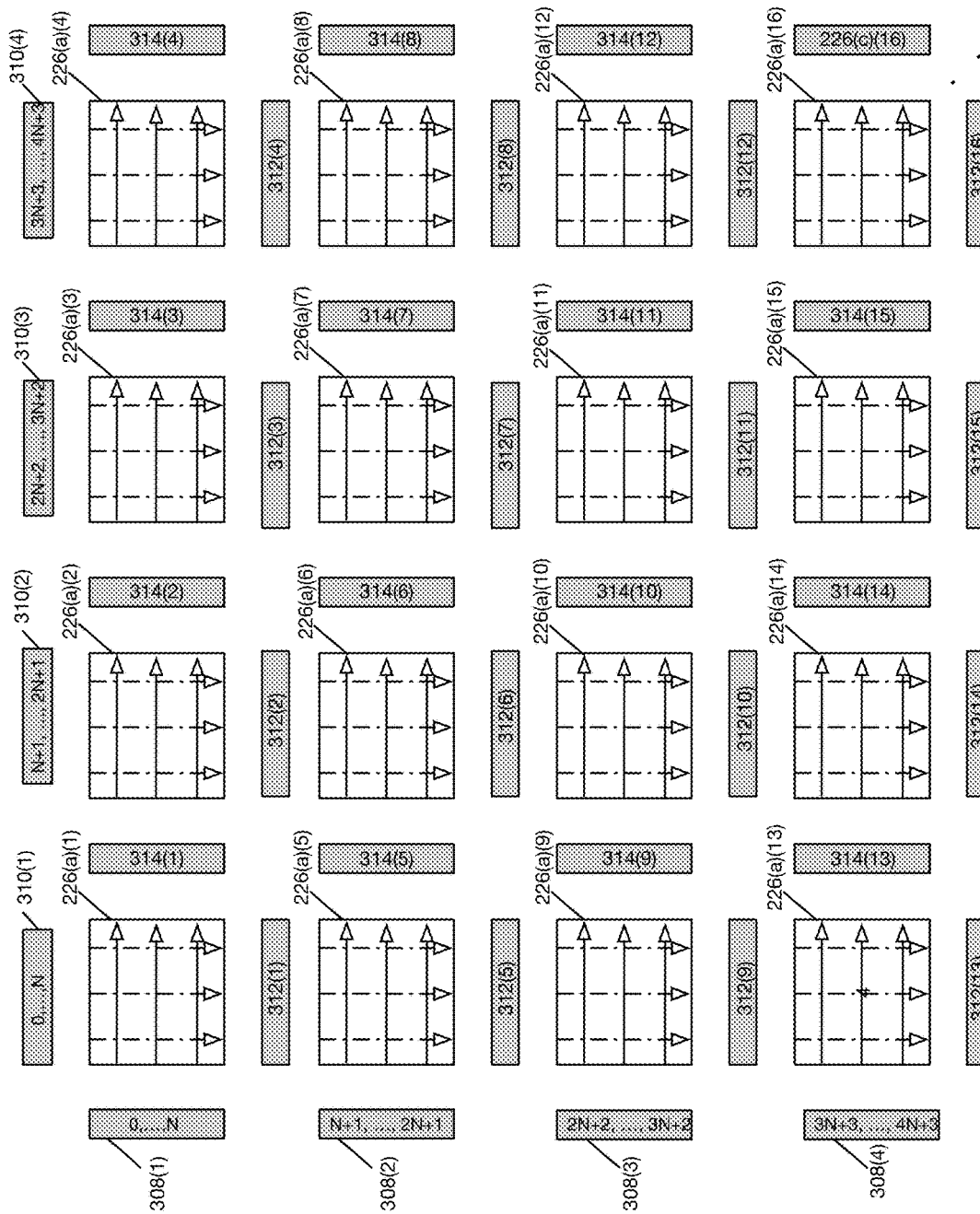
FIG. 3a depicts 2-D RNN processing of a portion of a high-resolution image that has been segmented into a set of tiles according to one embodiment of the present invention.

FIG. 3*a* depicts 2-D RNN processing of a portion of a high-resolution image that has been segmented into a set of tiles according to one embodiment of the present invention. FIG. 3*a* shows feature maps 226(*a*)(1)-226(*a*)(16), which correspond to each output of convolutional network 222 for each respective tile 224(1)-224(N). For purposes of this discussion, the feature maps 226(*a*)(1)-226(*a*)(16) are represented in FIG. 3*a* as tiles because there is a one-to-one correspondence between tiles 224(1)-224(N) of high-resolution document image 202 and feature maps 226(*a*)(1)-226(*a*)(N). That is, each feature map 226(*a*)(1)-226(*a*)(N) represents a respective output of convolutional network 222 for a respective tile 224(1)-224(N). Although FIG. 3*a* only shows feature maps 226(*a*)(1)-226(*a*)(16), it will be understood that these feature maps only correspond to a portion of tiles 224(1)-224(N) and in fact high-resolution document image 202 may be segmented into a smaller or greater number of tiles, in which case the number of feature maps 226 shown in FIG. 3*a* would be larger or smaller and would correspond precisely to the number of segmented tiles of high-resolution document image 202.

FIG. 3*a* also shows horizontal RNN initial state vectors 308(1)-308(4), vertical RNN initial state vectors 310(1)-310(4), vertical inter-tile RNN state vectors 312(1)-312(16) and horizontal inter-tile RNN state vectors 314(1)-314(16).

For purposes of the present discussion, the processing of a particular feature map (e.g., 226(*a*)(1)) will be described. It will be understood that the processing of other feature maps such as 226(*a*)(2)-226(*a*)(16) will proceed in a similar and analogous fashion. Thus, all discussion regarding feature map 226(*a*)(1) and its associated processing applies as well to feature maps 226(*a*)(2)-226(*a*)(16). According to one embodiment, each feature map 226(*a*)(1) is of tensor dimension H×W×C, where H corresponds to the height in rows, W corresponds to the width and C corresponds to the number of channels of feature map 226(a). For purposes of this example, it is assumed that H=W=N. According to one embodiment, N=227. However, N may assume any value.

As previously described, according to some embodiments, vertical RNN 206(a) may be associated with a set of RNNs (not shown). During the processing of each feature map 226(a)(1), the set of vertical RNNs associated with vertical RNN 206(a) may act in parallel to process each column of feature map 226(a)(1). According to an alternative embodiment, vertical RNN 206(a) is associated with a single RNN, in which case each row of feature map 226(a)(1) may be processed one-by-one. It is assumed that each of the RNNs associated with vertical RNN 206(a) has a respective state size of S.

As previously described with respect to FIG. 2a, vertical RNN 206(a)(1) processes feature map 226(a)(1) to generate feature map 226(b) (not shown in FIG. 3a).

According to one embodiment, each RNN associated with vertical RNN 206(a) processes each row of feature map 206(a)(1) and emits a state vector of size W×S. That is, a state vector of tensor dimension W×S is generated for each row of feature map 206(a)(1). In particular, according to one embodiment, at each step, vertical RNN 206(a) process all the C channels present at that location in the H×W×C feature map. Thus, for all rows in feature map 206(a)(1), vertical RNN 206(a) generates feature map 226(b) (not shown in FIG. 3a) of tensor dimension H×W×S.

Vertical inter-tile state vector 312(1) is then generated utilizing the last row of feature map 226(b), which will be utilized for processing feature map 226(a)(5), which corresponds to a subsequent tile.

Horizontal RNN 206(b) then processes feature map 226(b) to generate feature map 226(c) (not shown in FIG. 3a). Similar to vertical RNN 206(a), according to some embodiments, horizontal RNN 206(b) may be associated with a set of RNNs (not shown). During the processing of each feature map 226(b) the set of vertical RNNs associated with horizontal RNN 206(b) may act in parallel to process each row of feature map 226(b). According to an alternative embodiment, horizontal RNN 206(b) is associated with a single RNN, in which case each column of feature map 226(b) may be processed one-by-one. It is assumed that each of the RNNs associated with horizontal RNN 206(b) has a respective state size of S'.

According to one embodiment, each RNN associated with horizontal RNN 206(b) processes each row of feature map 226(b) and emits a state vector of size H×S'. That is, a state vector of tensor dimension H×S' is generated for each column of feature map 226(b). Thus, for all columns in feature map 206(b)(1), horizontal RNN 206(b) generates feature map 226(c) (not shown in FIG. 3a) which is of tensor dimension H×W×S'.

Horizontal inter-tile state vector 314(1) is then generated utilizing the last column of feature map 226(c), which will be utilized for processing feature map 226(a)(2), which corresponds to a subsequent tile.

Figure 3B:
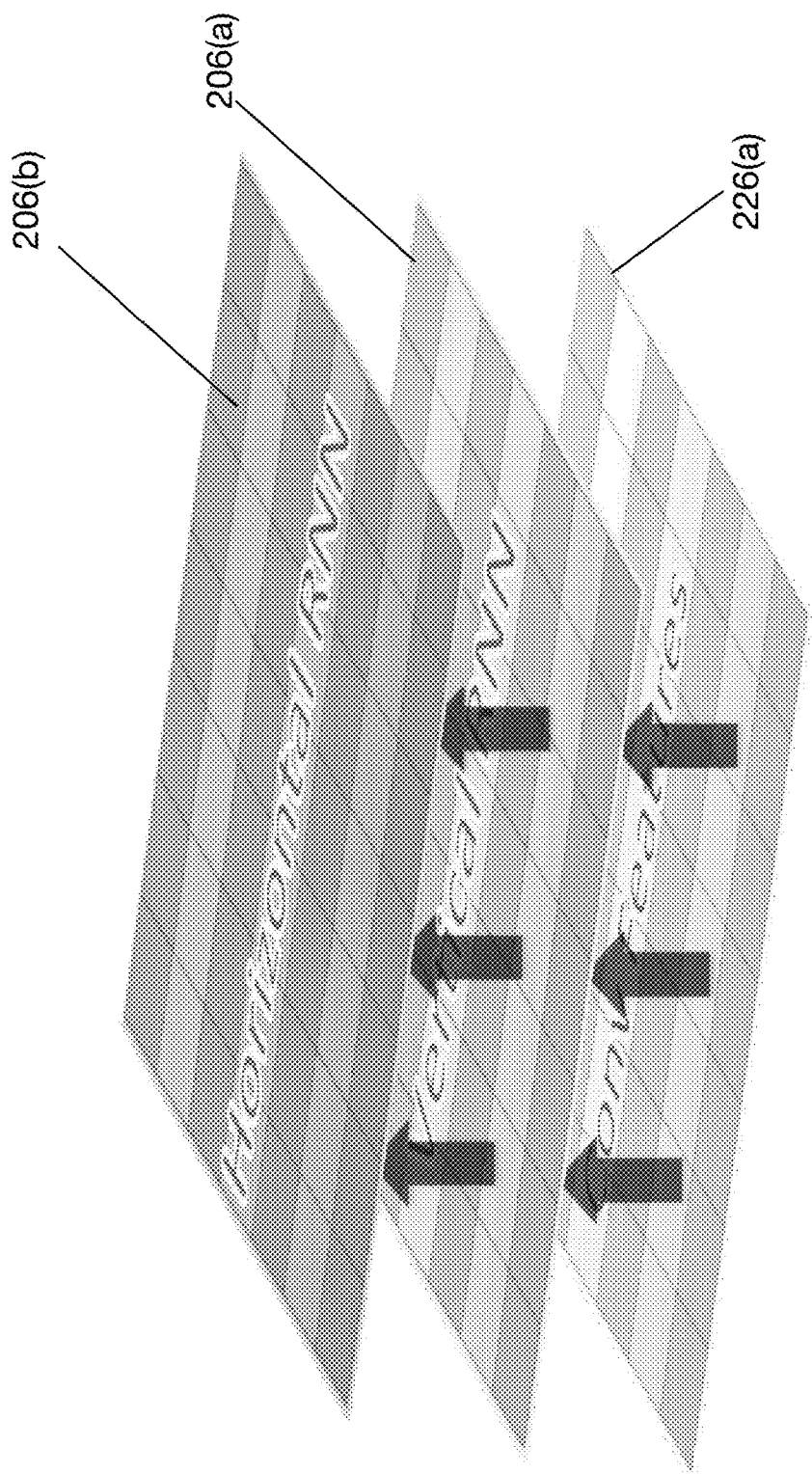
FIG. 3b depicts an architecture for processing a feature map generated by a convolutional network according to an embodiment of the present disclosure.

FIG. 3b depicts an architecture for processing a feature map generated by a convolutional network according to an embodiment of the present disclosure. As shown in FIG. 3b, feature map 226(a) is processed by vertical RNN 206(a). The output of vertical RNN 206(a) (not shown in FIG. 3b) is then processed by horizontal RNN 206(b).

Figure 3C:
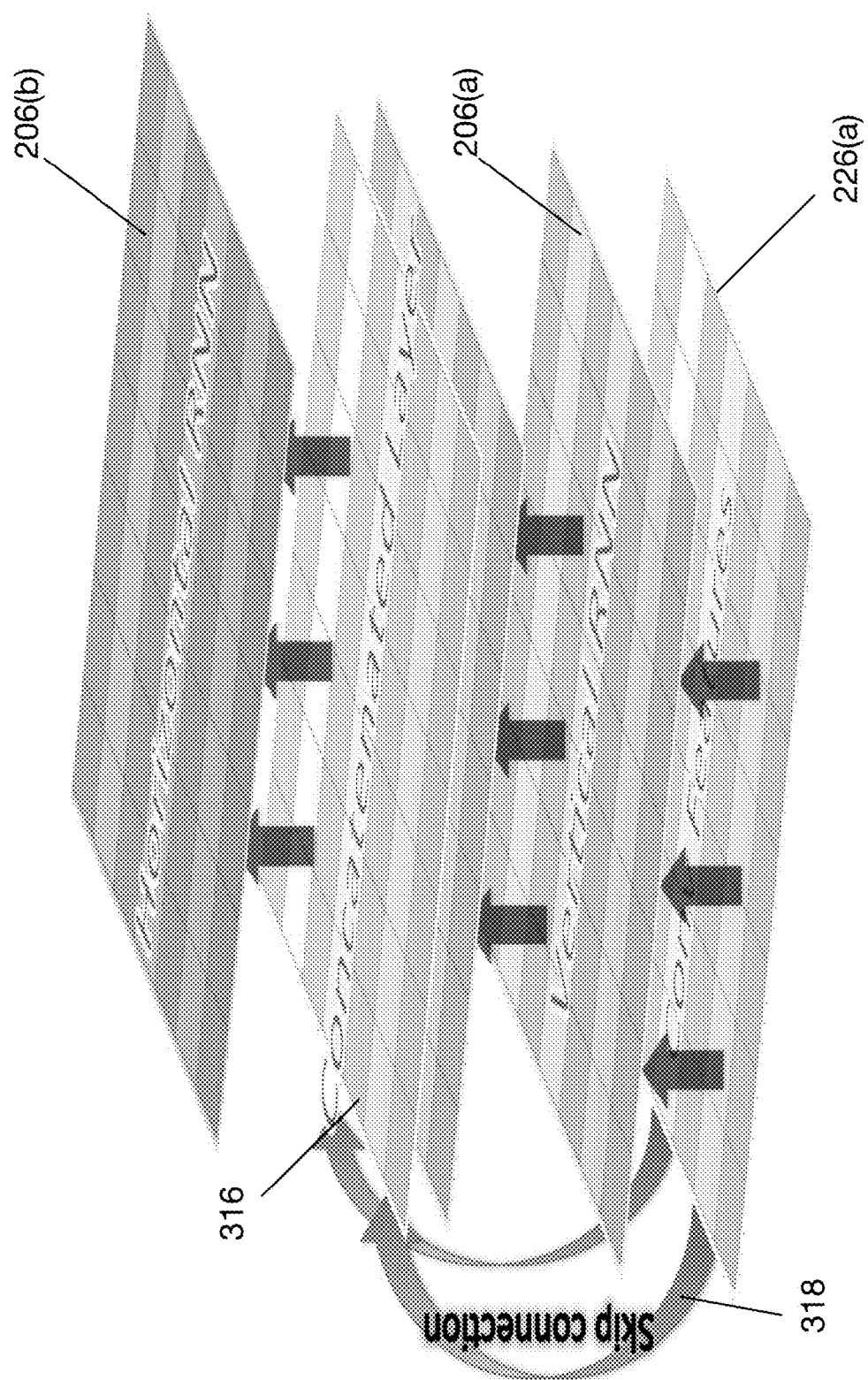
FIG. 3c depicts an alternative architecture for processing a feature map generated by a convolutional network according to an embodiment of the present disclosure.

FIG. 3c depicts an alternative architecture for processing a feature map generated by a convolutional network according to an embodiment of the present disclosure. FIG. 3c is similar to FIG. 3b but has an additional concatenation layer 316 that receives input from both feature map 226(a) via skip connections 318 and vertical RNN 206(a). The output of concatenation layer 316 (not shown in FIG. 3c) is then provided to horizontal RNN. The embodiment depicted in FIG. 3c allows potentially greater accuracy as it combines features from lower level features (i.e., feature map 226(a)) as well as higher level features (i.e., the output of vertical RNN 206(a)) for processing via horizontal RNN 206(b).

Figure 3D:
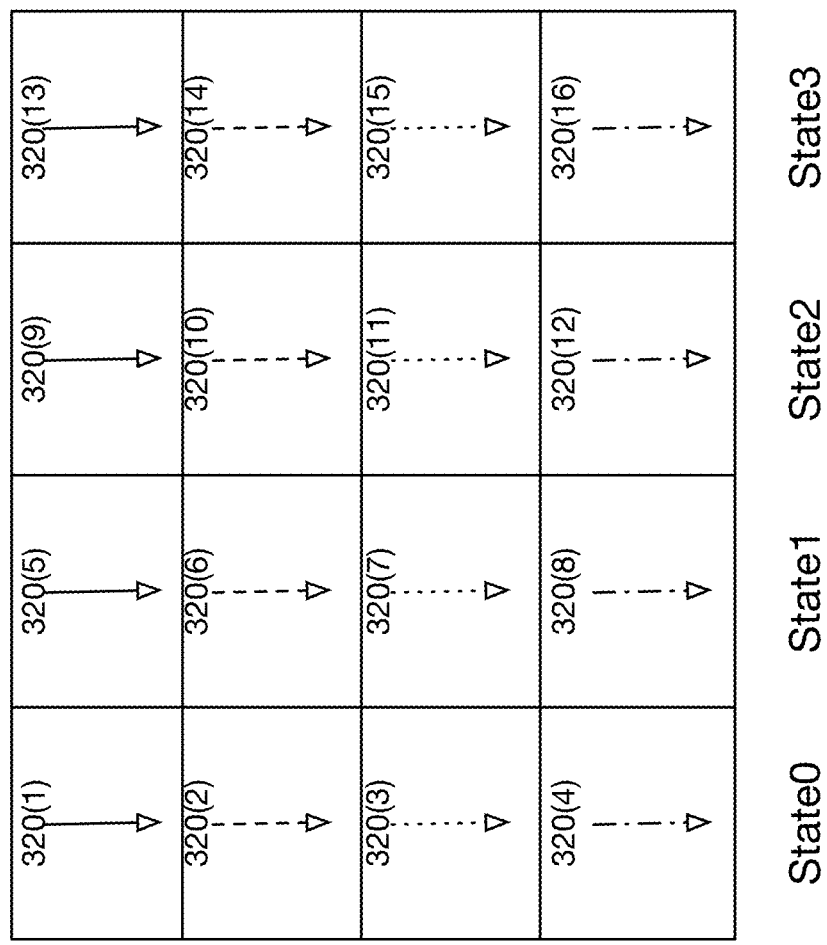
FIG. 3d depicts a single-threaded processing sequence for a vertical RNN according to an embodiment of the present disclosure.

FIG. 3d depicts a single-threaded processing sequence for a vertical RNN according to an embodiment of the present disclosure. Each box shown in the FIG. 3d may represent a single element of feature map 226(a). As shown in FIG. 3d, for each column, the associated rows are processed sequentially (e.g., 320(1)-320(4), 320(5)-320(8), 320(9)-320(12), 320(13)-320(16)).

Figure 3E:
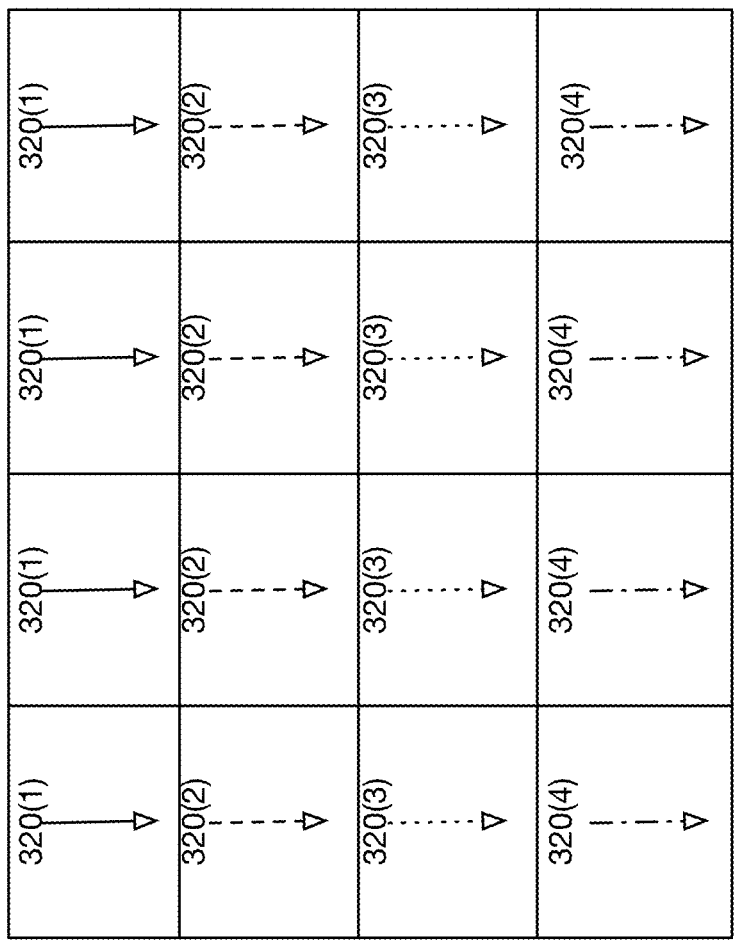
FIG. 3e depicts a multi-threaded processing sequence for a vertical RNN according to an embodiment of the present disclosure

FIG. 3e depicts a multi-threaded processing sequence for a vertical RNN according to an embodiment of the present disclosure. As shown in FIG. 3e, each row is processed in parallel by multiple threads, wherein each thread is associated with a respective column. That is, for example, each element 320(1) in the first row is processed by a separate thread (not shown in FIG. 3e). Once the elements in the first row have been processed, each element in the second row is processed (i.e., 320(2)) by multiple associated threads.

FIG. 4 depicts a input image and output image that has been processed by a form extraction network according to an embodiment of the present disclosure. As depicted in FIG. 4, the final output is a set of labeled pixels for the image. The output of the RNN is thus a label for each pixel. The example depicted in FIG. 4 illustrates a simplified scenario in which only 3 labels corresponding to features are detected: background, text and widgets. Green (dark shading) represents a run of text. Yellow (light shading) represents a widget where data is to be entered. Although FIG. 4 depicts only 2 detected features, it will be understood that any number of features may be detected by form extraction network 200.

Figure 5:
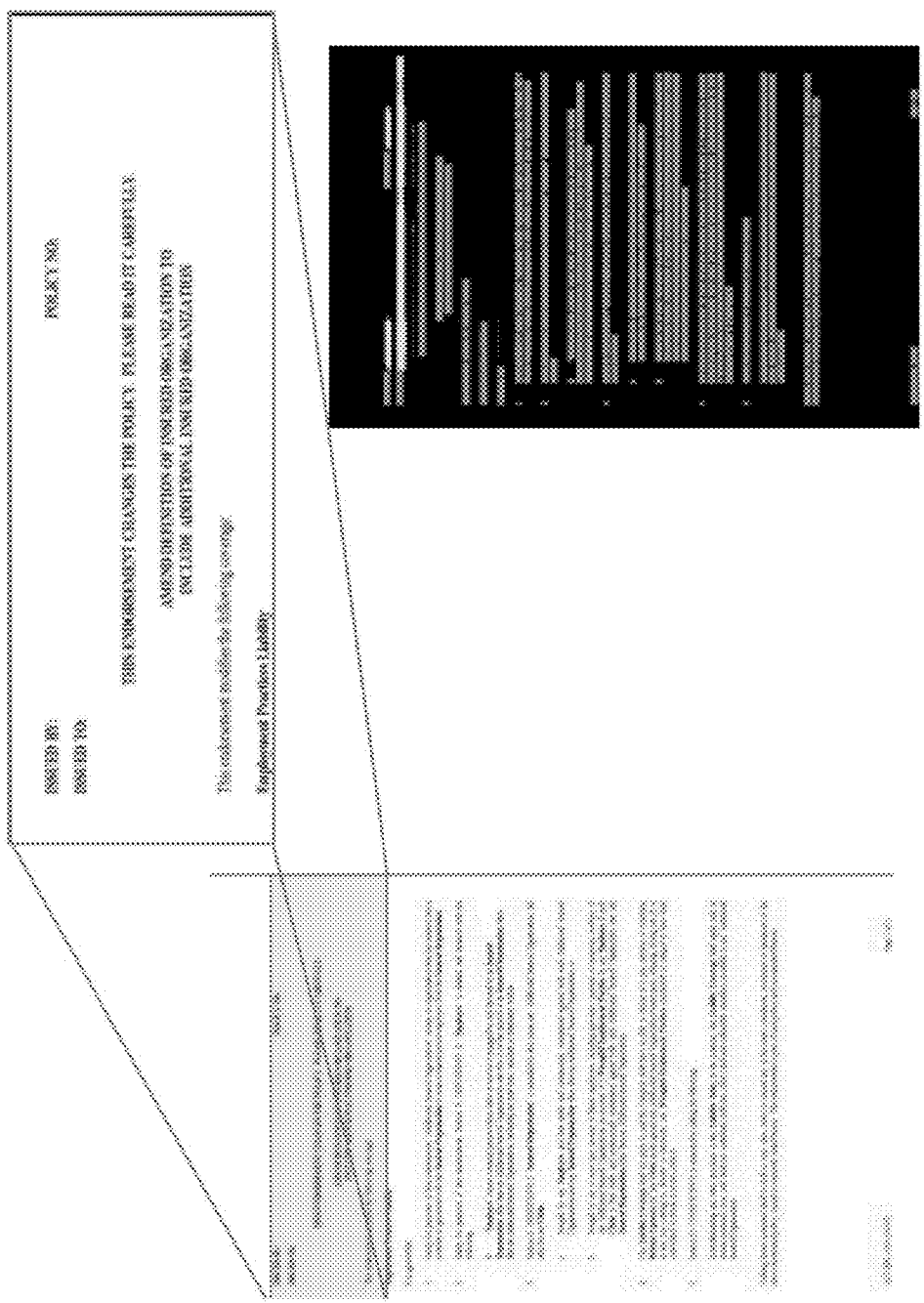
FIG. 5 depicts an input image and output image that has been processed by a form extraction network according to an embodiment of the present disclosure.

FIG. 5 depicts an input image and output image that has been processed by a form extraction network according to an embodiment of the present disclosure.

Figure 6A:
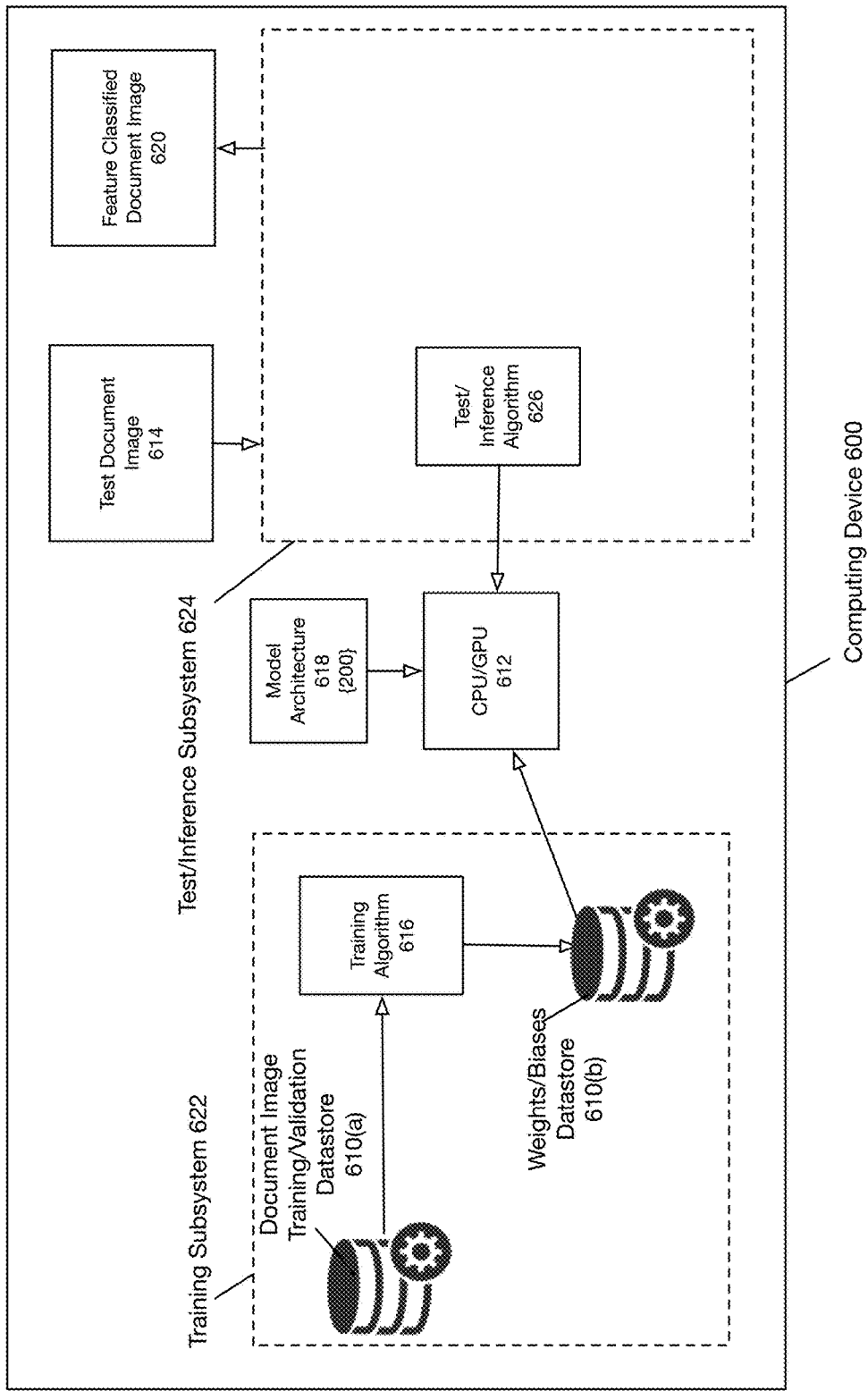
FIG. 6a illustrates an example computing system that executes a form extraction network 200 in accordance with various embodiments of the present disclosure.

FIG. 6a illustrates an example computing system that executes a form extraction network 200 in accordance with various embodiments of the present disclosure. As depicted in FIG. 6a, computing device 600 includes CPU/GPU 612, training subsystem 622 and test/inference subsystem 624. Training subsystem 622 and test/inference subsystem 624 may be understood to be programmatic structures for carrying out training and testing of form extraction network 200. In particular, CPU/GPU 612 may be further configured via programmatic instructions to execute training and/or testing of form extraction network 200 (as variously described herein, such as with respect to FIGS. 3-4). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. For instance, a project store may be external to the computing device 600. Computing device 600 can be any stand-alone computing platform, such as a desk top or work station computer, laptop computer, tablet computer, smart phone or personal digital assistant, game console, set-top box, or other suitable computing platform.

Training subsystem 622 further comprises document image training/validation datastore 610(a), which stores training and validation document images. Training algorithm 616 represents programmatic instructions for carrying out training of form extraction network 200 in accordance with the training described herein. As shown in FIG. 6a, training algorithm 616 receives training and validation document form images from training/validation datastore 610(*a*) and generates optimal weights and biases, which are then stored in weights/biases datastore 610(*b*). As previously described, training may utilize a backpropagation algorithm and gradient descent or some other optimization method.

Test/Inference subsystem further comprises test/inference algorithm 626, which utilizes form extraction network 200 and the optimal weights/biases generated by training subsystem 622. CPU/GPU 612 may then carry out test/inference algorithm 626 based upon model architecture and the previously described generated weights and biases. In particular, test/inference subsystem 624 may receive test document image 614 from which it may feature classified document image 620 using network 200.

Figure 6B:
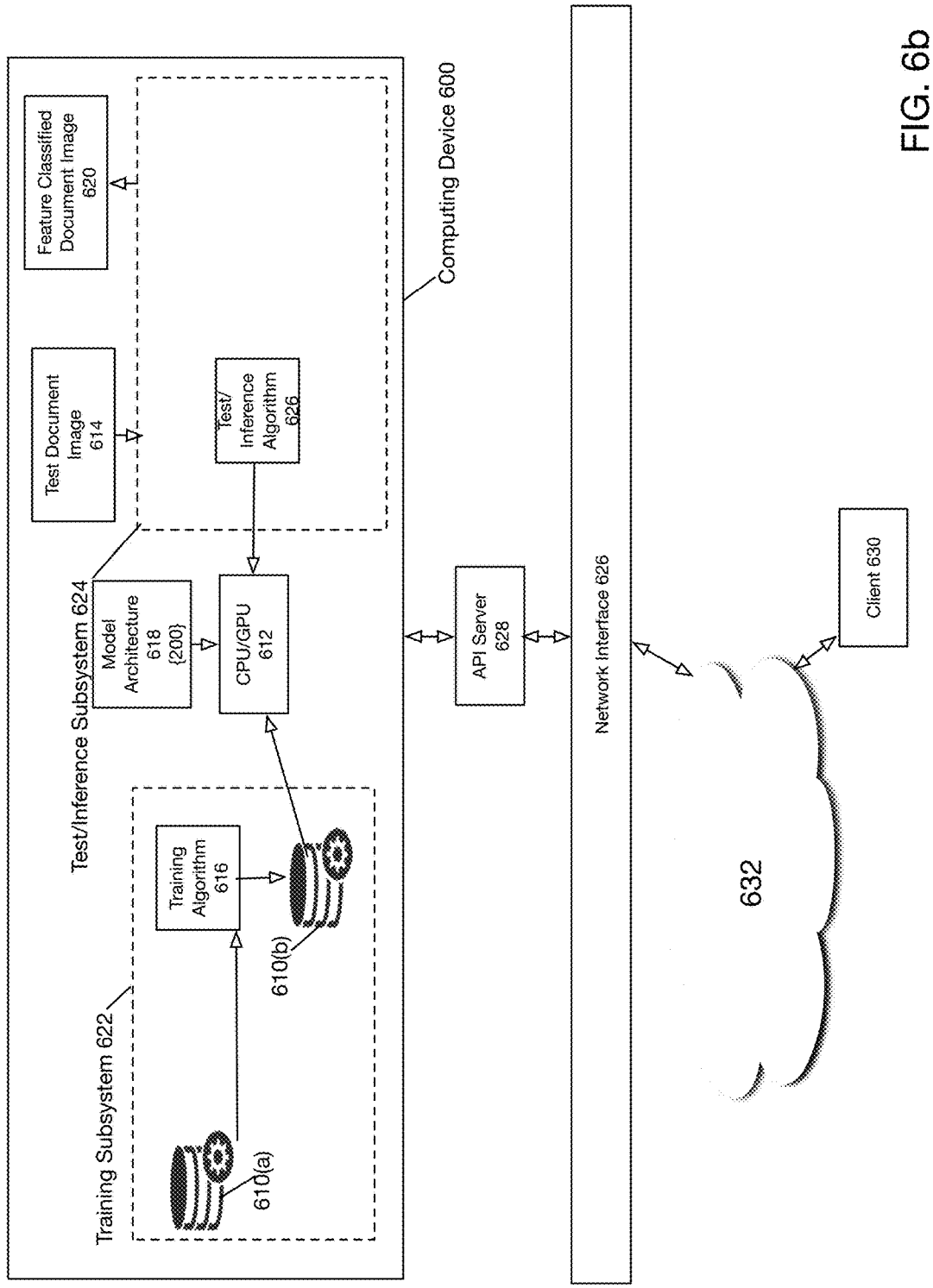
FIG. 6b illustrates an example integration of a document extraction network 200 into a network environment according to one embodiment of the present disclosure.

FIG. 6b illustrates an example integration of a document extraction network 200 into a network environment according to one embodiment of the present disclosure. As depicted in FIG. 6b, computing device 600 may be collocated in a cloud environment, data center, local area network ("LAN") etc. Computing device 600 shown in FIG. 6b is structured identically to the example embodiment described with respect to FIG. 6a. In this instance, computing device 600 may be a server or server cluster, for example. As shown in FIG. 6b, client 600 interacts with computing device 600 via network 632. In particular, client 630 may make requests and receive responses via API calls received at API server 628, which are transmitted via network 632 and network interface 626. It will be understood that network 632 may comprise any type of public or private network including the Internet or LAN.

It will be further readily understood that network 508 may comprise any type of public and/or private network including the Internet, LANs, WAN, or some combination of such networks. In this example case, computing device 600 is a server computer, and client 630 can be any typical personal computing platform As will be further appreciated, computing device 600, whether the one shown in FIG. 6a or 6b, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

Further Example Embodiments

The following examples pertain to further embodiments, from which numerous permutations and configurations will be apparent.

Example 1 is a method for extracting structure from an image of a document, the method comprising receiving a high-resolution image of said document, said high-resolution image comprising a plurality of pixels, generating a plurality of tiles from said image, each of said tiles comprising a subset of pixels from said high-resolution image, processing a tile by a neural network, wherein processing each tile includes classifying a pixel as being associated with a document element of said document, said element comprising a fillable form field and textual content associated with said fillable form field and generating an editable digital version of said document using the classified pixel, said editable digital version including the fillable form field and textual content.

Example 2 includes the subject matter of Example 1, wherein processing each tile separately by a neural network comprises for each tile processing said tile by a convolutional network to generate a first feature map, processing said first feature map by a 2-D recurrent neural network ("RNN") to generate a second feature map, processing said second feature map to generate class predictions for each pixel in said tile and, aggregating each of said respective predictions for each pixel of said high-resolution image to generate a global feature map for said document.

Example 3 includes the subject matter of Example 2, wherein said 2-D RNN further comprises a vertical RNN and a horizontal RNN, wherein said vertical RNN generates a third feature map from said first feature map and said horizontal RNN generates said second feature map from said third feature map.

Example 4 includes the subject matter of Example 2, and further comprises periodically after a pre-determined number of steps executed by said 2-D RNN, performing a global-lookup process, wherein said global look-up process further comprises modifying state information associated with said 2-D RNN based upon a latent space representation of said document, wherein said latent space representation is generated based upon a second image of said document, wherein said second image has a resolution lower than that of said high-resolution image.

Example 5 includes the subject matter of Example 4, wherein modifying state information associated with said 2-D RNN further comprises generating an attention map from said second feature map, generating a mean context vector using said second feature map and said latent space representation, generating state modification information using said mean context vector and, modifying state information associated with said 2-D RNN using said state modification information.

Example 6 includes the subject matter of Example 5, wherein said mean context vector is generated according to the relationship: $E(z)=\Sigma p_{ij}z_{ij}$, where z is generated from said latent space representation and p is an attention map.

Example 7 includes the subject matter of Example 6, wherein said latent space representation is generated by an autoencoder.

Example 8 is a network for performing extraction and classification of document forms comprising a first branch, said first branch further comprising a segmentation block for segmenting a high-resolution document image comprising a plurality of pixels into a plurality of tiles, wherein each tile comprises a subset of pixels of said high-resolution document image, a convolutional network for processing each tile to generate a first feature map, a 2-D RNN, wherein said 2-D RNN processes said first feature map to generate a second feature map, a classification block, wherein said classification block processes said second feature map to generate a classification vector for a pixel in a tile, a softmax block for generating a probability distribution for a pixel in a tile, said probability distribution indicating a probability that said pixel is associated with a document element class, a second branch, said second branch further comprising an image scaler block, wherein said image scaler block generates a lower resolution document image from said high-resolution document image and, an autoencoder, wherein said autoencoder processes said lower-resolution document image to generate at latent space representation of said lower-resolution document image and, a global-lookup block, wherein said global lookup-block causes said 2-D RNN to consider tiles associated with said high-resolution document image that have not currently been processed by 2-D RNN.

Example 9 includes the subject matter of Example 8, wherein said autoencoder further comprises an encoder and a decoder and said latent space representation is generated by said encoder.

Example 10 includes the subject matter of Example 9, wherein said 2-D RNN further comprises a vertical RNN and a horizontal RNN, wherein said vertical RNN processes a tile in a vertical orientation and said horizontal RNN processes a tile in a horizontal orientation.

Example 11 includes the subject matter of Example 10, wherein said 2-D RNN stores state information including vertical inter-tile state information and horizontal inter-tile state information, wherein said state information is utilized to correlate information between at least two tiles.

Example 12 includes the subject matter of Example 11, wherein said global-lookup block utilizes said latent space representation and an output of said horizontal RNN to modify said state information of said 2-D RNN.

Example 13 includes the subject matter of Example 12, wherein said second feature map is processed by an attention generating network to generate an attention map.

Example 14 includes the subject matter of Example 13, wherein said attention map and said state information are utilized to generate a mean context vector according to the relationship $E(z)=\Sigma p_{ij}z_{ij}$, where z is generated from said latent space representation and p is an attention map.

Example 15 is a computer program product including one or more non-transitory machine readable mediums encoded with instructions that when executed by one or more processors cause a process to be carried out for performing document form extraction and classification from an input high-resolution image of a document, said process comprising generating a high-resolution image of said document, said high-resolution image comprising a plurality of pixels, generating a plurality of tiles from said high-resolution image, each of said tiles comprising a subset of pixels from said high-resolution image, for each tile processing said tile by a convolutional network to generate a first feature map, processing said first feature map by a 2-D recurrent neural network ("RNN") to generate a second feature map, processing said second feature map to generate class predictions for each pixel in said tile and, aggregating each of said respective predictions for each pixel of said high-resolution image to generate a global feature map for said document.

Example 16 includes the subject matter of Example 15, wherein said 2-D RNN further comprises a vertical RNN and a horizontal RNN, wherein said vertical RNN generates a third feature map from said first feature map and said horizontal RNN generates said second feature map from said third feature map.

Example 17 includes the subject matter of Example 15, and further comprises periodically after a pre-determined number of steps executed by said 2-D RNN, performing a global-lookup process, wherein said global look-up process further comprises modifying state information associated with said 2-D RNN based upon a latent space representation of said document, wherein said latent space representation is generated based upon a second image of said document, wherein said second image has a resolution lower than that of said high-resolution image.

Example 18 includes the subject matter of Example 17, wherein modifying state information associated with said 2-D RNN further comprises generating an attention map from said second feature map, generating a mean context vector using said second feature map and said latent space representation, generating state modification information using said mean context vector and, modifying state information associated with said 2-D RNN using said state modification information.

Example 19 includes the subject matter of Example 18, wherein said mean context vector is generated according to the relationship: $E(z)=\Sigma p_{ij}z_{ij}$, where z is generated from said latent space representation and p is an attention map.

Example 20 includes the subject matter of Example 19, wherein said latent space representation is generated by an autoencoder.

In some example embodiments of the present disclosure, the various functional modules described herein and specifically training and/or testing of network 200, may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for extracting structure from an image of a document, the method comprising:

receiving a high-resolution image of said document, said high-resolution image comprising a plurality of pixels;

generating a plurality of tiles from said image, each of said tiles comprising a subset of pixels from said high-resolution image;

processing each tile separately by a neural network,
wherein processing each tile includes classifying a pixel as being associated with a document element of said document, said element comprising a fillable form field and textual content associated with said fillable form field, and
wherein processing each tile separately by the neural network comprises, for each tile, processing said tile by a convolutional network to generate a first feature map, and processing said first feature map by a 2-D recurrent neural network ("RNN") to generate a second feature map, and processing said second feature map to generate class predictions for each pixel in said tile;

aggregating each of said respective predictions for each pixel of said high-resolution image to generate a global feature map for said document; and generating an editable digital version of said document using the classified pixel, said editable digital version including the fillable form field and textual content.

2. The method according to claim 1, wherein said 2-D RNN further comprises a vertical RNN and a horizontal RNN, wherein said vertical RNN generates a third feature map from said first feature map and said horizontal RNN generates said second feature map from said third feature map.

3. The method according to claim 1, further comprising periodically after a pre-determined number of steps executed by said 2-D RNN, performing a global-lookup process, wherein said global look-up process further comprises:
modifying state information associated with said 2-D RNN based upon a latent space representation of said document, wherein said latent space representation is generated based upon a second image of said document, wherein said second image has a resolution lower than that of said high-resolution image.

4. The method according to claim 3, wherein modifying state information associated with said 2-D RNN further comprises:
generating an attention map from said second feature map;
generating a mean context vector using said second feature map and said latent space representation;
generating state modification information using said mean context vector; and,
modifying state information associated with said 2-D RNN using said state modification information.

5. The method according to claim 4, wherein said mean context vector is generated according to the relationship: $E(z)=\Sigma p_{ij}z_{ij}$, where z is generated from said latent space representation and p is an attention map.

6. The method according to claim 5, wherein said latent space representation is generated by an autoencoder.

7. A system for performing extraction and classification of document forms, the system comprising:
a processor configured to implement:
a segmentation block for segmenting a high-resolution document image comprising a plurality of pixels into a plurality of tiles, wherein each tile comprises a subset of pixels of said high-resolution document image;
a convolutional network for processing each tile to generate a first feature map;
a 2-D recurrent neural network ("RNN"), wherein said 2-D RNN processes said first feature map to generate a second feature map;
a classification block, wherein said classification block processes said second feature map to generate a classification vector for a pixel in a tile;
a softmax block for generating a probability distribution for a pixel in a tile, said probability distribution indicating a probability that said pixel is associated with a document element class;
an image scaler block, wherein said image scaler block generates a lower resolution document image from said high-resolution document image;
an autoencoder, wherein said autoencoder processes said lower-resolution document image to generate at latent space representation of said lower-resolution document image; and,
a global-lookup block, wherein said global lookup-block causes said 2-D RNN to consider tiles associated with said high-resolution document image that have not currently been processed by the 2-D RNN.

8. The system of claim 7, wherein said autoencoder further comprises an encoder and a decoder and said latent space representation is generated by said encoder.

9. The system of claim 8, wherein said 2-D RNN further comprises a vertical RNN and a horizontal RNN, wherein said vertical RNN processes a tile in a vertical orientation and said horizontal RNN processes a tile in a horizontal orientation.

10. The system of claim 9, wherein said 2-D RNN stores state information including vertical inter-tile state information and horizontal inter-tile state information, wherein said state information is utilized to correlate information between at least two tiles.

11. The system of claim 10, wherein said global-lookup block utilizes said latent space representation and an output of said horizontal RNN to modify said state information of said 2-D RNN.

12. The system of claim 11, wherein said second feature map is processed by an attention generating network to generate an attention map.

13. The system claim 12, wherein said attention map and said state information are utilized to generate a mean context vector according to the relationship $E(z)=\Sigma p_{ij}z_{ij}$, where z is generated from said latent space representation and p is an attention map.

14. A computer program product including one or more non-transitory machine readable mediums encoded with instructions that when executed by one or more processors cause a process to be carried out for performing document form extraction and classification from an input high-resolution image of a document, said process comprising:
generating a high-resolution image of said document, said high-resolution image comprising a plurality of pixels;
generating a plurality of tiles from said high-resolution image, each of said tiles comprising a subset of pixels from said high-resolution image;
for each tile:
processing said tile by a convolutional network to generate a first feature map,
processing said first feature map by a 2-D recurrent neural network ("RNN") to generate a second feature map, and
processing said second feature map to generate class predictions for each pixel in said tile; and, aggregating each of said respective predictions for each pixel of said high-resolution image to generate a global feature map for said document.

15. The computer program product according to claim 14, wherein said 2-D RNN further comprises a vertical RNN and a horizontal RNN, wherein said vertical RNN generates a third feature map from said first feature map and said horizontal RNN generates said second feature map from said third feature map.

16. The computer program product according to claim 14, further comprising periodically after a pre-determined number of steps executed by said 2-D RNN, performing a global-lookup process, wherein said global look-up process further comprises:

modifying state information associated with said 2-D RNN based upon a latent space representation of said document, wherein said latent space representation is generated based upon a second image of said document, wherein said second image has a resolution lower than that of said high-resolution image.

17. The computer program product according to claim 16, wherein modifying state information associated with said 2-D RNN further comprises:

generating an attention map from said second feature map;

generating a mean context vector using said second feature map and said latent space representation;

generating state modification information using said mean context vector; and, modifying state information associated with said 2-D RNN using said state modification information.

18. The computer program product according to claim 17, wherein said mean context vector is generated according to the relationship: $E(z)=\Sigma p_{ij} z_{ij}$, where z is generated from said latent space representation and p is an attention map.

19. The computer program product according to claim 18, wherein said latent space representation is generated by an autoenoder.

* * * * *